US012088736B2

United States Patent
Cameron

(10) Patent No.: US 12,088,736 B2
(45) Date of Patent: Sep. 10, 2024

(54) METHODS AND SYSTEMS FOR AUTHORIZING TRANSACTIONS BASED ON A DERIVED PUBLIC KEY

(71) Applicant: Shopify Inc., Ottawa (CA)

(72) Inventor: David Cameron, Kitchener (CA)

(73) Assignee: Shopify Inc., Ottawa (CA)

( * ) Notice: Subject to any disclaimer, the term of this patent is extended or adjusted under 35 U.S.C. 154(b) by 283 days.

(21) Appl. No.: 17/857,904

(22) Filed: Jul. 5, 2022

(65) Prior Publication Data

US 2024/0015030 A1    Jan. 11, 2024

(51) Int. Cl.
| | |
|---|---|
| H04L 9/00 | (2022.01) |
| G06Q 20/36 | (2012.01) |
| H04L 9/08 | (2006.01) |
| H04L 9/32 | (2006.01) |

(52) U.S. Cl.
CPC .......... *H04L 9/3252* (2013.01); *G06Q 20/36* (2013.01); *H04L 9/0825* (2013.01); *H04L 9/3213* (2013.01); *H04L 9/50* (2022.05)

(58) Field of Classification Search
CPC ....... H04L 9/3252; H04L 9/50; H04L 9/0825; H04L 9/3213; G06Q 20/36
See application file for complete search history.

(56) References Cited

U.S. PATENT DOCUMENTS

| | | | | |
|---|---|---|---|---|
| 2020/0027084 A1* | 1/2020 | Groarke | .................... | H04L 9/30 |
| 2021/0167962 A1* | 6/2021 | Wang | .................... | H04L 9/3213 |
| 2021/0357916 A1* | 11/2021 | Vladi | ................. | G06Q 20/3678 |
| 2022/0222364 A1* | 7/2022 | Roberts | .................... | G06F 21/64 |
| 2023/0298015 A1* | 9/2023 | Kiraz | .................... | H04L 9/0861 |

FOREIGN PATENT DOCUMENTS

WO    WO-2020257123 A1 * 12/2020

\* cited by examiner

*Primary Examiner* — Hee Soo Kim
(74) *Attorney, Agent, or Firm* — Rowand LLP

(57) ABSTRACT

Methods and systems for authorizing transaction requests from user device based on blockchain asset-based access control rules. A server receives a digital signature from a user device and independently generates the message that was signed by the user device. The user device does not send the public key. The server derives the public key from the message and the digital signature and then queries the blockchain network to confirm it corresponds to a valid wallet address. The server obtains ownership data associated with the wallet address from the blockchain network and, based on the ownership data, determines whether to authorize a requested transaction.

21 Claims, 7 Drawing Sheets

FIG. 8

METHODS AND SYSTEMS FOR AUTHORIZING TRANSACTIONS BASED ON A DERIVED PUBLIC KEY

TECHNICAL FIELD

The present disclosure relates to transaction processing systems and, in particular, to methods of authorizing transactions based on blockchain data associated with a public key.

BACKGROUND

Certain online interactions, like e-commerce sessions, may involve the input and exchange of sensitive or identifying information. This may include personal data and/or payment data.

In some cases, e-commerce systems and other system may enable or disable certain features or may make transactions or responses/requests conditional on blockchain data. To this end, a user device in communication with an e-commerce system or other such system may provide the system with information regarding one or more blockchain wallets (e.g. wallet addresses). In some cases, this may include using WalletConnect or some other mechanism for transferring wallet information from a secure wallet application on a user device through a mobile application or browser to the system. This can include providing public key data and/or proving ownership of a public key through providing a digital signature.

BRIEF DESCRIPTION OF THE DRAWINGS

Embodiments will be described, by way of example only, with reference to the accompanying figures wherein:

FIG. 8 is an example of a home page of an administrator, in accordance with an example embodiment.

Like reference numerals are used in the drawings to denote like elements and features.

DETAILED DESCRIPTION OF EMBODIMENTS

Figure 1:
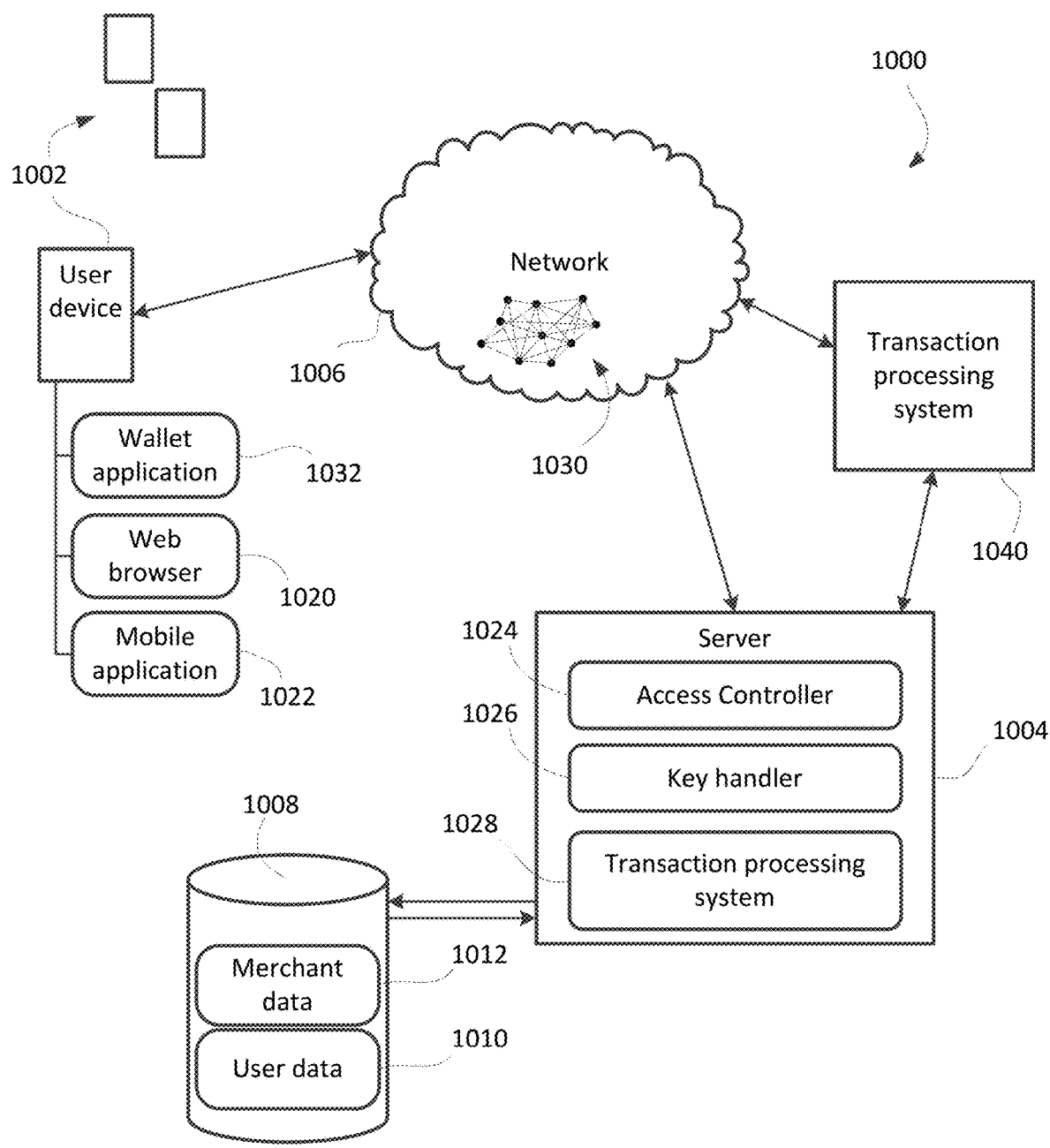
FIG. 1 is a simplified example system.

As e-commerce begins to incorporate more blockchain-based interactions, there is a risk of revealing an association between wallet addresses and identifying information. For example, software present at a user device may listen to or monitor an instance of a browser session or an e-commerce application instance. That may result in inadvertently revealing an individual's blockchain holdings. Interception of a digital signature also poses an issue of potential replay in another session or instance, possibly by another user device/user, thereby gaining gated access to exclusive content to which that user device/user would not normally have access.

In one aspect, the present application discloses a computer-implemented method. The method may include receiving, by a server from a user device, a digital signature for a message, the message being based on session-specific data regarding an active session with a transaction processing system and being signed using a private key associated with a blockchain wallet address. The method may further include generating, by the server, the message based on the session-specific data; deriving, based on the message as generated by the server and the digital signature as received, a public key corresponding to the private key used to generate the digital signature; obtaining blockchain data associated with the public key from a blockchain network; and authorizing a transaction on the transaction processing system for the user device based on the blockchain data.

In this manner, the methods and systems reduce the exposure of sensitive data and make it more difficult to link public key and user data, whilst still enabling the reliance upon blockchain data as a condition for authorizing a transaction.

In some implementations, the message is not transmitted between the user device and the server.

In some implementations, the public key is not transmitted between the user device and the server.

In some implementations, the session-specific data includes at least one of a session identifier, a cart token, or a checkout token.

In some implementations, the digital signature is generated using elliptic curve cryptography.

In some implementations, the blockchain data includes non-fungible token data associated with the blockchain wallet address. In some cases, authorizing the transaction includes permitting the transaction based on ownership of one or more non-fungible tokens by the blockchain wallet address.

In some implementations, obtaining blockchain data associated with the public key from the blockchain network includes verifying that the public key corresponds to the blockchain wallet address and obtaining non-fungible token ownership data associated with the blockchain wallet address.

In some implementations, communications between the user device and the server occur over a data connection and wherein the message includes at least one data element determined independently by the user device and the server and not transmitted over the data connection. In some cases, the at least one data element includes a nonce value independently determined by each of the user device and the server using respective deterministic pseudorandom number generators.

In another aspect, the present application discloses a computing system that may include one or more processing units, one or more data storage units, and memory storing processor-executable instructions that, when executed by the one or more processing units, are to cause the processing units to carry out the operations of one or more of the methods or processes described herein.

In yet another aspect, a non-transitory, computer readable storage medium is disclosed. The medium may store processor-executable instructions that, when executed, cause one or more processors to carry out the operations of one or more of the methods or processes described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrases "at least one of . . . and . . . " and "at least one of . . . or . . . " are intended to cover any one or more of the listed elements, including any one of the listed elements alone, any sub-combination, or all of the elements, without necessarily excluding any additional elements, and without necessarily requiring all of the elements.

In the present application, the terms "e-commerce platform" or "e-commerce system" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and associated payment requests, via an e-commerce platform, and the e-commerce platform may be equipped with transaction/payment processing components or delegate such processing activities to one or more third-party services. An e-commerce platform may be extendible/extensible by connecting one or more additional sales channels representing platforms where products can be sold. The e-commerce platform may serve one merchant in some implementations. The e-commerce platform may be a multi-merchant platform in other cases, where each merchant is able to use some or all of the available services to configure an online storefront and provide commerce services to customers of the online storefront. A multi-merchant e-commerce platform may operate across a range of geographic regions, and may operate in multiple countries, currencies, and time zones.

The growth of blockchain networks has led to the development of non-fungible tokens (NFT). Each NFT is a unique combination of characteristics/attributes and/or media. In many implementations, a smart contract may be created for the purpose of minting and/or tracking NFTs. The Ethereum blockchain network has an associated standard, ERC-721, providing a reference implementation of a smart contract for tracking and managing NFTs. Various other standards, such as ERC-1155 for non-fungible tokens and/or ERC-20 for fungible tokens, may apply. In some cases, the NFTs generated by a smart contract may form a collection, in that the NFTs generated by that smart contract have some limited universe of possible attributes or characteristics. In some cases, the NFTs in a collection are computer-generated art in which various layers of digital art are made available for pseudo-randomized selection to generate each unique digital media. The layers may correspond to particular characteristics, such as various eyes, mouths, hats, accessories, etc., used to generate a unique digital image of a character. In some other cases, the NFTs in a collection may be images or videos that relate to a particular type of activity, sport, or other interest, such as images or videos of particular football players, video clips from baseball plays, photographs of a specific celebrity or group of celebrities, etc. Example NFT collections include, for example, the "Bored Ape" collection, the "NBA™ TopShot" collection, or the "Invisible Friends" collection.

A smart contract is executable computer code recorded on the blockchain that, when properly "called" in a subsequent blockchain transaction, executes so as to carry out its defined operations. In the case of an NFT smart contract, a minting operation may cause the smart contract to produce a new unique NFT. That unique NFT may be digital art, an image, a video, or a combination thereof in some examples. Each NFT may have associated attributes or characteristics. Example attributes include the elements pseudo-randomly selected for generation of the digital image, such as specific eyes, mouth, accessories, etc., for an image of a character. Another set of example attributes may be the context or characteristics of a particular image or video, such as the identity of the person/player featured, the team or teams involved, the date, the score, the type of play, or other such features.

Once NFTs are minted, they may be made available through an online marketplace in some cases. Various wallets, i.e. network-connected computing devices with blockchain wallet software operating thereon, may initiate blockchain transactions to obtain and/or transfer NFTs. Ownership of an NFT by a wallet is recorded on-chain and is verifiable by third parties. In some cases, a wallet may own a plurality of NFTs. The ownership of those NFTs by a wallet may be verifiable by third parties based on a query to the blockchain network, i.e. to a blockchain node, providing data from the wallet, such as a public key associated with the wallet. In some cases the query may identify the NFTs by way of unique identifiers, or by way of an identifier for the NFT collection to which they belong. The blockchain node may respond by providing verification that the public key provided is associated with the NFT as reflected in the data recorded on the blockchain. The NFT smart contract may provide functions for verifying NFT ownership data.

NFTs may be used to represent ownership interest in some auto-generated digital media. In other cases, NFTs may be used as a "proof-of-purchase" or a receipt or record of ownership or investment. In this context, NFTs may indicate a history of purchases or certain product items and, in some cases, record current ownership of those product items. An NFT may, for example, contain a record of purchase for one or more real items (e.g. grocery store produce) and/or virtual items (e.g. a link to an image file). In some cases, the NFT may contain a record of purchase of a non-perishable real-world item, such as real estate, a financial instrument, an automobile, etc.

In yet other examples, NFTs may be used as a "ticket" for access or as a "proof-of-attendance". For instance, a concert ticket may be minted and recorded as an NFT, which when validated at a venue (e.g. using a QR code scanner or the like to obtain a wallet identifier and an NFT identifier and then validate ownership via a blockchain query) grants the holder of the user device access to the concert. As another example, an NFT may record the fact of attendance at an event, such as a training course or a social event. NFTs may signal membership in a club, attendance at a restaurant, participation or level or progress in an online game, or any other such events.

Ownership of NFTs can be proxies or indicators of a user's affiliation with a group or entity, past transactions, affinity for certain products or services, and/or preference for particular teams, groups or styles. In determining whether to grant access to certain limited availability products or services, e-commerce platforms may look to NFT ownership as a factor. That is, ownership of a particular NFT, an NFT with certain attributes, or a type/class of NFT may be a condition for access to certain products, services, discounts, or offers. This may be of particular use in the case of limited edition products, restricted access events, or the like.

An e-commerce system may gate access to certain products, offers, etc., by obtaining wallet information from a user device and determining, through querying a blockchain network, whether the user device has the credentials that prove ownership of certain NFTs. In some implementations the e-commerce system may gate approval for certain transaction requests, such as accessing certain restricted products or processing a purchase transaction, based on ownership of one or more particular NFTs or NFTs having certain attributes. The wallet information may identify the NFTs and the purported owner (by way of wallet identifier or address, which is often a public key, e.g. a "wallet public key"). In some cases, the wallet information may provide a wallet identifier and the e-commerce platform may query the blockchain network to obtain data regarding the NFTs held by that wallet identifier.

Control or ownership of the NFTs associated with a wallet identifier is proven cryptographically by the user device. For example, the user device may receive a message from the e-commerce system and may then sign the message using a private key that corresponds to the wallet public key. The user device returns the digital signature to the e-commerce system, which verifies the digital signature, since it has the corresponding public key and message. If verified, then the e-commerce system has validated that the user device holds the private key that corresponds to the wallet public key.

In some situations, data exchanged or input during e-commerce interactions may be intercepted or revealed. For example, at a user device software may be present that listens to an instance of a browser session or an e-commerce application instance. There is a risk that such software may be able to intercept the incoming message to be signed, and/or intercept the outgoing digital signature produced by the user device. The public key may be intercepted, which may then be associated with personal identifying information that may be input during the e-commerce session, thereby tying personal identity to a wallet address. That may result in inadvertently revealing an individual's blockchain holdings. Interception of the digital signature also poses an issue of potential replay in another session or instance, possibly by another user device/user, thereby gaining gated access to exclusive content to which that user device/user would not normally have access.

Advantageously, example systems and methods are described below with improved security of NFT-gated e-commerce interactions. To protect privacy and prevent data leakage or replay attacks, the e-commerce system and user device may minimize the data exchanged over a communication channel. In one example, the user device may avoid sending a public key, e.g. a wallet address, to the e-commerce system. Instead, the user device may send a digital signature to the e-commerce system and the e-commerce system may derive the associated public key from the digital signature and the message that was signed. In some digital signature schemes it may be possible to derive a public key from a message and a digital signature of that message. In some digital signature schemes, more than one message and more than one digital signature may be needed to derive the public key. In some situations, derivation of the public key may produce two or more candidate public keys. By querying the blockchain network for a wallet address that corresponds to the derived public key, the e-commerce system thereby validates that the derived public key corresponds to the private key used in the digital signature and corresponds to an existing wallet address. In finding a matching address, the system effectively verifies that the user device has control over the private key associated with that wallet address and the user thus owns or controls the digital assets held by that wallet address. Advantageously, the e-commerce system does not need to be provided with the public key in advance and the user device does not need to reveal its association with that public key during the e-commerce session. The user device may provide just the digital signature without retrieving and providing wallet information that might otherwise be associated with other personal data revealed during the e-commerce section, such as during a checkout or shipping phase.

In some implementations, the e-commerce system may also avoid sending the message over the channel and may instead rely on the user device to assemble the same message at its end based on a known structure and format. The message may include at least one session-specific data item, such as a session key or token to prevent replay attacks. In some cases, the message may include a secret data item known to both the e-commerce system and the user device but not communicated in the channel or exposed on the user device in an unencrypted form.

The examples below describe illustrative access control rules that have a condition based on NFT ownership, e.g. ownership of a particular NFT or class of NFT, or NFTs having certain attributes or characteristics. However, the present application is not limited to conditions based on NFTs. In some cases, the condition may be based on ownership by a wallet address of another blockchain asset, such as a fungible token. As an example, the condition may be that the wallet address have a certain minimum quantity of a particular fungible token, or that the wallet address have two or more different types of particular fungible tokens. Combinations of such conditions may also be set within an access control rule.

Reference will now be made to FIG. 1, which diagrammatically illustrates a simplified example system 1000 in accordance with an aspect of the present application. In this example, the system 1000 includes a network-connected server 1004, which may be an e-commerce system or e-commerce platform in some implementations, and a plurality of user devices 1002. The user devices 1002 and server 1004 may communicate over a network 1006. The network 1006 may include interconnected wired and/or wireless networks, including the Internet. The user devices 1002 may include a range of computing devices, such as laptops, desktops, tablets, smartphones, and the like. In the case where the server 1004 implements an e-commerce system or platform, the server 1004 may include a transaction processing system 1028 configured to receive transaction requests from one of the user devices 1002 with regard to particular product or service items made available by the server 1004 through an online storefront, and to carry out a checkout process with the user device 1002 and to trigger payment processing. Details regarding the structure of an example e-commerce system and transaction processing operations are provided later below. In some cases, the server 1004 may provide access control operations with regard to transactions, some or all of which may be processed by a separate server or entity, such as transaction processing system 1040.

The server 1004 may be implemented using one or more servers. The server 1004 may include data storage 1008, which may include one or more databases or other data structures within or accessible to the servers. The data storage 1008 may include user data 1010, which may include registered user information, user account data, historical transaction data, preferences and settings, etc. The data storage 1008 may further include merchant data 1012 regarding merchant accounts with the server 1004, including merchant identifiers and settings and parameters for respective merchants. The merchant data 1012 may further include product records. In some cases, each merchant account has a set of associated product records reflecting the products or services offered via that merchant account. The product records may include details regarding one or more products, images, pricing, shipping information, technical parameters, textual description, reviews, or other data regarding the product. Product records may be grouped into classes and/or subclasses.

The user devices 1002 may include a web browser 1020 and/or a mobile application 1022 through which the user device 1002 is able to connect with the server 1004 in order to browse a merchant's online store interface so as to view available product or services. The web pages or other resources served to the user devices via the web browser 1020 or mobile application 1022 may be generated or obtained from the stored product records. As a user device 1002 searches or browses products from a particular merchant, the server 1004 may retrieve the corresponding merchant data 1012, including product records, for causing display of the product data on the user device 1002.

The server 1004 includes an access controller 1024. The access controller 1024 may be implemented by way of suitable computer executable code for regulating access to some or all of the product records and other data within the server 1004. In the case where the transaction processing system 1040 is separate from the server 1004, the access controller 1024 may receive requests from the transaction processing system 1040 to determine whether a user device is granted access or permission for a transaction request on the transaction processing system 1040, and the access controller 1024 determines whether access is granted and provides a response accordingly. In one example, the access controller 1024 may limit access to some or all of the features or options available by way of user authentication. That is, user's, such as customers or merchants, accessing the server 1004 or transaction processing system 1040 using a remote device must provide valid user credentials to be authenticated. Once authenticated, the user is granted the level of access corresponding to their user type or class. A merchant user may gain access to edit its product records, store design, and some of its merchant data 1012. In some cases, a customer user need not provide any user credentials and is permitted to browse merchant stores or to make purchases in a "guest" mode. If credentials are provided, the user may be "logged in" to a user account that enables access to additional features or saved preferences, including purchase history, loyalty points, saved purchase credentials (e.g. credit card details), or other user-specific features.

In this example, the network 1006 further includes a blockchain network 1030. The blockchain network 1030 may operate in accordance with a blockchain protocol, such as Bitcoin or Ethereum, as examples. The user device 1002 may include a wallet application 1032, which is a blockchain application on the user device 1002 that may store blockchain-related data. In some cases, the wallet application 1032 may securely store public and private key pairs associated with the user device 1002. The public keys, e.g. wallet addresses, may be shared and made publicly available for the purpose of receiving blockchain-based data transfers of fungible or non-fungible tokens. The private keys may be stored securely and confidentially and may be used by the wallet application 1032 in certain signature operations for providing digital signatures that prove ownership of corresponding public keys, e.g. wallet addresses, among other things. The wallet application 1032 may be referred to as a simplified payment verification (SPV) client in some implementations.

In some implementations, the wallet application 1032 may be configured to provide data to the e-commerce system. For example, the wallet application 1032 may use the open-source WalletConnect protocol to connect and interact with decentralized applications (dApps). Other protocols may be used in other implementations. In some cases, the connect protocol may be used to connect the wallet application 1032 to the mobile application 1022. In some cases the connect protocol may be used to connect the wallet application 1032 to the web browser 1020. In short, the wallet application 1032 is configured such that it is able to provide blockchain-related data to the e-commerce system regarding wallet identifiers or NFTs purportedly owned by the user device 1002, and/or to authenticate the user device's 1002 ownership of certain public keys associated with particular NFTs recorded on the blockchain network 1030. In accordance with some aspects of the present application, the user device 1002 may be configured to locally generate a message, to digitally sign the message, and to send only a digital signature to the server 1004, without also sending the corresponding public key (e.g. wallet identifier) or any details of the NFTs associated the wallet identifier. The server 1004 may generate the same message and may use the message and the received digital signature to derive the public key corresponding to the private key used in generating the digital signature. The server 1004 may then query the blockchain network 1030 using the derived public key to identify whether there is a corresponding blockchain address and to obtain NFT ownership data with regard to that address.

The server 1004 may include a key handler 1026 that is configured to generate a message that is also independently generated at the user device 1002, and to derive a public key corresponding to the private key used by the user device 1002 to generate a digital signature of that message. The message may be generated such that it includes at least one session-specific data item, such as a session key, cart token, checkout token, or other piece of data known to both the user device 1002 and the server 1004 and specific to the current session. In this manner, the server 1004 obtains public key data (e.g. wallet address(es)) associated with the user device 1002 without the user device 1002 sending that data within the session or channel between the user device 1002 and the transaction processing system 1028, 1040. By querying the blockchain network 1030 using the derived public key data, the server 1004 determines whether there is a wallet address corresponding to the private key used by the user device 1002 in digitally signing the message. The server 1004 thereby determines that the user device 1002 has effective control over that wallet address, and can obtain NFT data associated with that address from the blockchain network 1030. This process may avoid leaking blockchain asset or public key data within the context of the transaction processing communications, thereby avoiding interception of data tying the personal information of the user to blockchain address data, which might otherwise compromise security and privacy in that data.

The access controller 1024 may be configured to control access to one or more of the product records and/or approval of transaction requests based upon access control rules. Each access control rule may specify one or more product records, or a class of product records, or transaction type, etc., to which it applies. Each access control rule may be associated with a specified one of the merchant accounts. Each access control rule may further include a condition for obtaining access to the associated one or more product records or class of product records or approval of a transaction request. The condition, in these examples, includes ownership of one or more NFTs having a specified set of attributes. The term "transaction request" in this application may refer to a request to access certain product records, a request to purchase one or more product items, or other such requests as may be sent from the user device 1002 to the server 1004 in relation to an e-commerce transaction.

When a user device 1002 makes a transaction request, such as to view a product record, the server 1004 determines whether a stored one of the access control rules applies to that transaction request and, if so, then the access controller 1024 determines whether the user device 1002 meets the requisite condition(s) in the access control rule. The condition may include ownership of an NFT having certain attributes. Accordingly, the server 1004 may obtain (or may have previously obtained) a digital signature from the user device 1002 and may derive the corresponding public key and query the blockchain network 1030 to determine whether there is a wallet address corresponding to the derived public key. It may then validate that the user device 1002 is associated with an NFT as owner according to the blockchain and that the NFT has the requisite certain attributes. The server 1004 may determine from NFT data obtained from the blockchain whether one or more of the NFTs has the requisite attributes. In some cases, a smart contract on chain within the blockchain network, and associated with an NFT collection that includes the NFT, may provide an ownership verification function. For example, in the context of Ethereum, an ERC-721 compliant smart contract may provide the ownerOf( ) function for determining the blockchain-recorded owner of a particular NFT.

Figure 2:
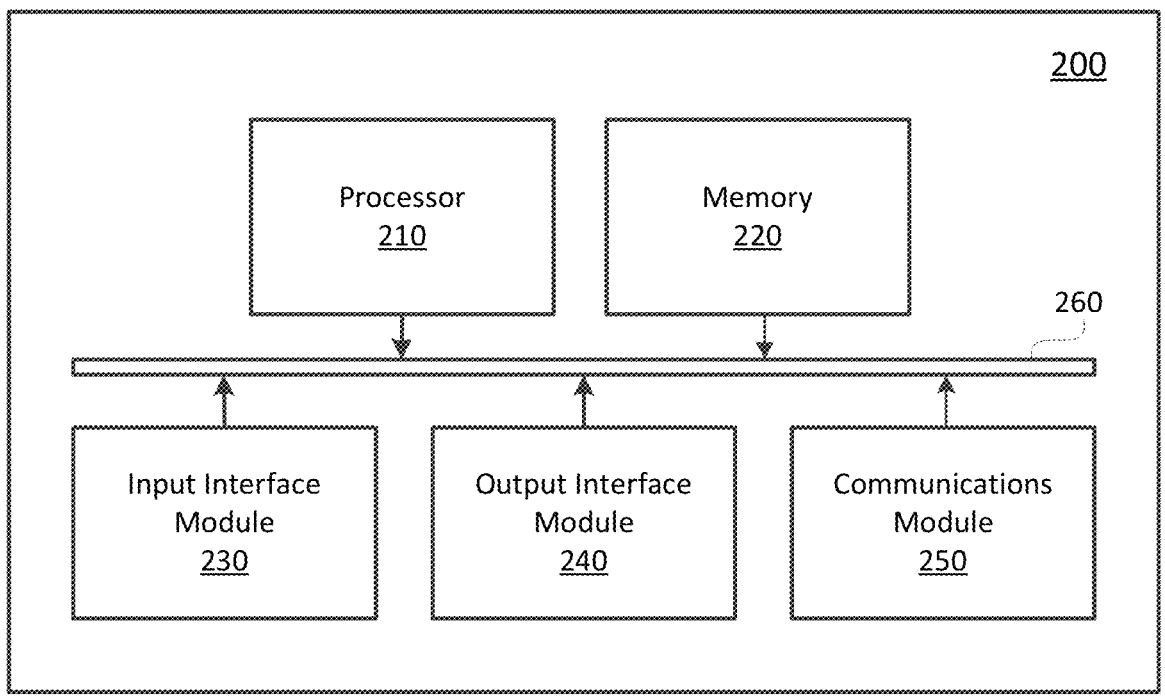
FIG. 2 is a high-level schematic diagram of a computing device.

The server 1004 and/or the user devices 1002 may be implemented using one or more computing devices. FIG. 2 is a high-level diagram of an example computing device 200. The example computing device 200 includes a variety of modules. For example, the example computing device 200 may include a processor 210, a memory 220, an input interface module 230, an output interface module 240, and a communications module 250. As illustrated, the foregoing example modules of the example computing device 200 are in communication over a bus 260.

The processor 210 is a hardware processor. The processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include one or more of a touchscreen input, keyboard, trackball or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, via the Ethernet family of network protocols, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software instructions are executed by the processor 210 from a computer-readable medium. For example, software may be loaded into random-access memory from persistent storage within memory 220. Additionally, or alternatively, instructions may be executed by the processor 210 directly from read-only memory of the memory 220.

Figure 3:
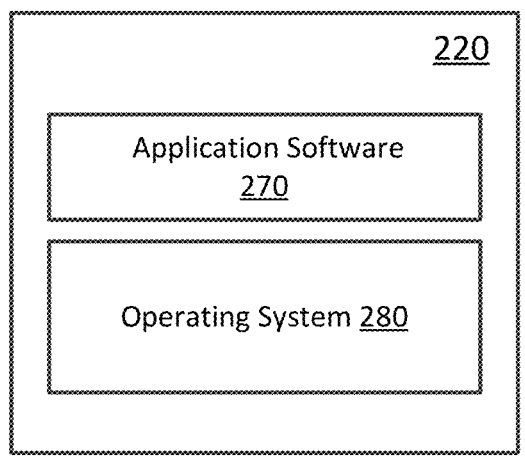
FIG. 3 shows a simplified organization of software components stored in a memory of the computing device of FIG. 2.

FIG. 3 depicts a simplified organization of software components stored in memory 220 of the example computing device 200. As illustrated, these software components include, at least, application software 270 and an operating system 280.

The application software 270 adapts the example computing device 200, in combination with the operating system 280, to operate as a device performing a particular function. While a single application software 270 is illustrated in FIG. 3, in operation, the memory 220 may include more than one application software and different application software may perform different operations. Example application software 270 in the case of the user device 1002 (FIG. 1) includes the wallet application 1032 (FIG. 1), the web browser 1020 (FIG. 1), or the mobile application 1022 (FIG. 1).

The operating system 280 is software. The operating system 280 allows the application software 270 to access the processor 210, the memory 220, the input interface module 230, the output interface module 240 and the communications module 250. The operating system 280 may, for example, be iOS™, Android™, Linux™, Microsoft Windows™, or the like.

Figure 4:
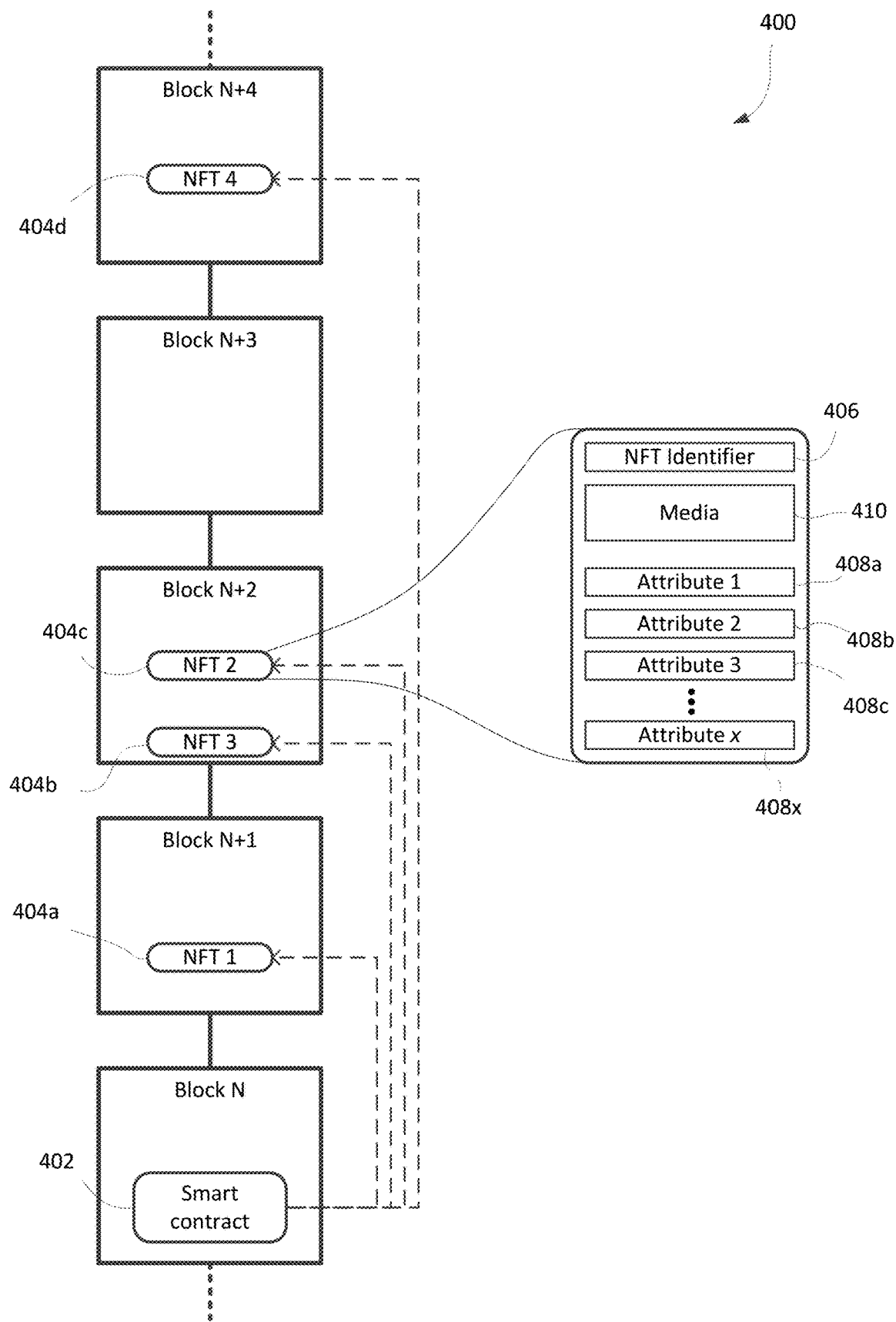
FIG. 4 graphically illustrates an example segment of a blockchain recording non-fungible tokens.

Reference is now made to FIG. 4, which illustrates an example blockchain 400. The blockchain 400 is a record of validated transactions grouped into blocks and successfully "mined" by one of the mining nodes within a blockchain network. Each block is immutable and is linked to the previous block by way of incorporating a hash of the previous block header within its own header. The functioning of a blockchain network and the variations possible under different blockchain protocols will be appreciated by those ordinarily skilled in the art.

A smart contract 402 may be implemented within the blockchain 400. In some cases, like with the Ethereum blockchain, the smart contract 402 may be executable code recorded on chain and may include functions that are available for execution by having those functions called in subsequent transactions. In this example, the smart contract 402 relates to NFT generation and/or management. That is, the smart contract 402 may have functions for minting NFTs, determining/validating ownership of those NFTs, transferring ownership of those NFTs from a current valid owner to a new owner. It will be appreciated that "ownership" is generally associated with an address, e.g. a public key value which may sometime be referred to as a wallet identifier. A computing device that holds the corresponding private key may be used to authenticate the computing device as the owner of that public key, thereby enabling the computing device to take actions with respect to the "owned" NFT, such as transferring it to a different public key.

When the smart contract 402 is used to mint NFTs, the minting and ownership data for that NFT may be recorded on the blockchain 400, as indicated by 404a, 404b, 404c, 404d (collectively, 404). In some cases, the NFT data recorded on chain includes, for example, a unique NFT identifier 406. In some instances, the NFT data recorded on chain may include one or more media files 410 or URI link(s) to one or more media files that are the subject of the NFT. The media files 410 may include, for example, an image file, a video file, an audio file, or combinations thereof.

The NFT data may further include one or more NFT attributes 408 (shown as 408a, 408b, 408c, . . . , 408x). The NFT attributes may include contextual information regarding the NFT, such as a minting date, a category, data regarding the features or characteristics of the media file 410, or any other such attributes of the subject matter of the NFT.

The NFTs 404 minted and managed by the smart contract 402 may be considered part of a collection of NFTs in that they are all governed by the same smart contract 402. In some cases, a collection of NFTs may be minted using different smart contracts or using non-blockchain code for generation of the NFTs and off-chain software for causing recordal of the NFTs on chain in blockchain transactions. Such NFTs may nevertheless be considered part of a single collection of NFTs if they are linked in such a manner as to form a collection, such as having a link or reference within each NFT identifying those NFTs as belonging to a specific collection. In one example, an NFT collection may have a single NFT.

Figure 5:
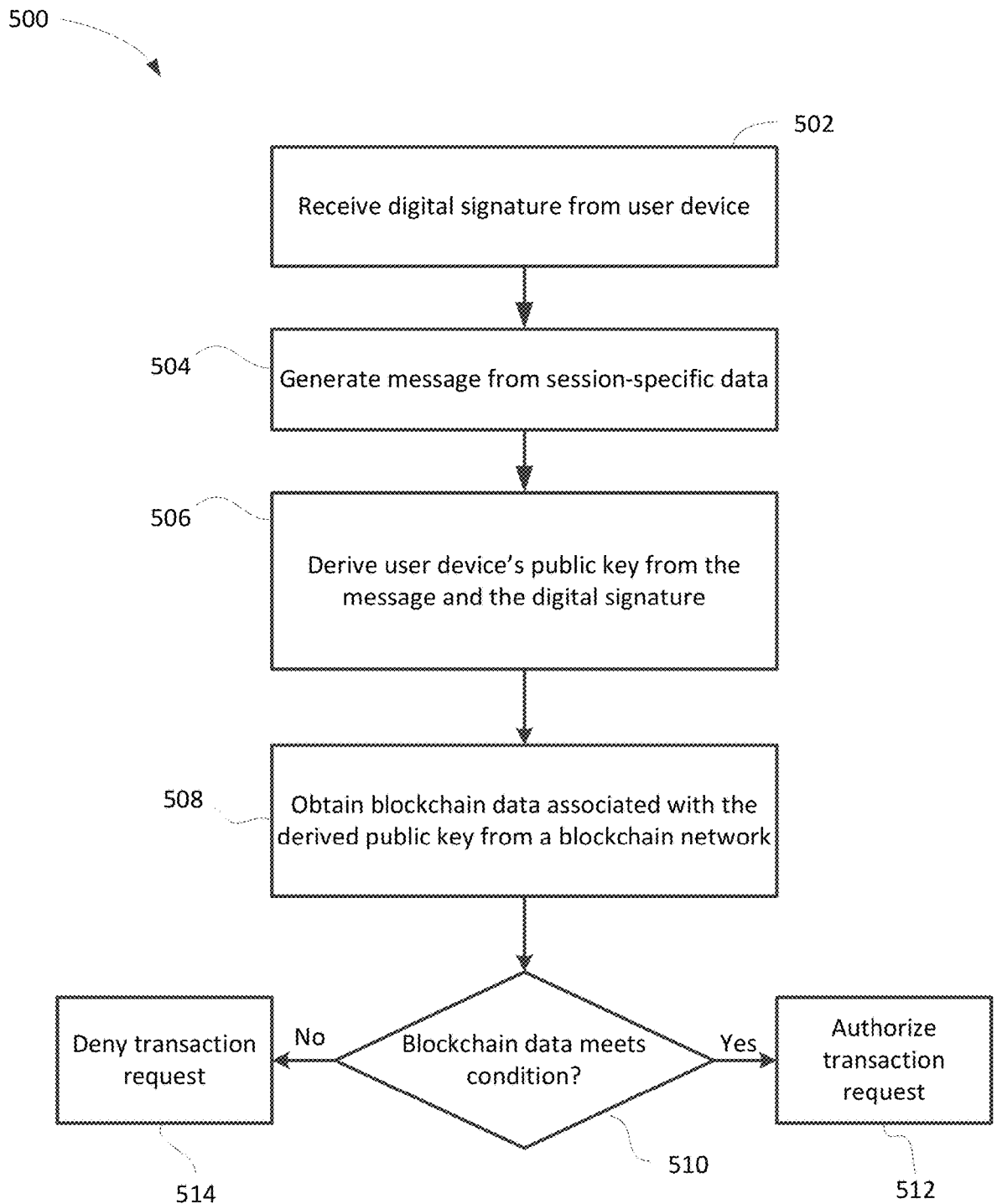
FIG. 5 shows, in flowchart form, one example method of authorizing a transaction request.

Reference will now be made to FIG. 5, which shows, in flowchart form, one example method 500 of approving transaction requests based on NFT ownership. The method 500 may be implemented by the server 1004 (FIG. 1) in some cases and, in some instances, by the access controller 1024 and/or key handler 1026. In particular, the method 500 may be implemented by way of suitably-programmed software instructions stored in memory on a computing device which, when executed by one or more processors of the computing device, cause the computing device to carry out the described operations. In some cases, the method 500 may be implemented by one or more servers forming an e-commerce platform or system.

In operation 502, the system receives a digital signature from a user device. The digital signature may be received from the user device within the context of a session established between the system and the user device. The session may include a handshaking process during which the user device and system establish the session and certain session-specific data, like a token or key or identifier for the session. The session-specific data may be exchanged in channel or may be developed independently at the system and the user device using some deterministic algorithm for mutually establishing the session-specific data. For instance, the system and the user device may use respective deterministic pseudorandom number generators to independently generate the same nonce value. Various key exchange processes may be carried out to encrypt communications between the user device and the system in some implementations. The communications may employ HTTPS, TLS, or other secure transfer protocols.

The digital signature is generated by the user device by digitally signing a message. The message is generated at the user device and includes at least one session-specific data item. The digital signature may be received by the system as part of a handshaking process or based on a wallet connect process in which the user device may signal it has a blockchain wallet application, and the server may request a digital signature (without necessarily sending the message to the user device).

In operation 504, the system generates the message independently from the user device. The system uses the same process and input data used by the user device so as to ensure the same message is generated by the system that was generated at the user device. The message includes at least one session-specific data item. The session-specific data item may be a session key, a cart token, a checkout token, or any other such data.

In operation 506, the system derives a public key using the message generated by the system and the digital signature received from the user device. It will be appreciated that in public key infrastructure (PKI) systems, computing devices are expected to keep their private key secret and to disclose the corresponding public key. The public key and private key are mathematically related in that the public key is typically generated using a cryptographically secure one way function using the private key. The mathematical relationship between the keys means that anyone with the public key can encrypt a message using the public key and only the computing device that has the private key is able to decrypt that encrypted message. It also means that the computing device holding the private key is able to generate a digital signature over a message and any other computing device can verify, using the public key and the original message, that only a device having the corresponding private key could have generated that digital signature. This latter property is what is used in blockchain networks to verify ownership of a private key. That is, the wallet software that needs to prove ownership/control of a wallet address provides a digital signature that proves it holds the private key that corresponds to that wallet address.

Some PKI signature schemes, like the elliptic curve digital signature algorithm (ECDSA), may permit derivation of the public key from the message and the digital signature. In some cases, the derivation process may generate two or more candidate public keys. Some ECDSA implementations may use an extended ECDSA signature that includes an additional bit to signal which of the candidate public keys is correct. Ethereum, for example, uses extended ECDSA signatures, which result in a {r, s, v} format signature, as opposed to the original {r, s} pair of a regular ECDSA signature. The "v" is a single byte that serves as a recover identifier. Alternatively, the system may generate more than one candidate public key and may test both to see if they are associated with wallet addresses in the blockchain network. The likelihood of both candidates having a corresponding wallet address in the blockchain network is negligibly small.

It will be appreciated that public key recovery is not limited to ECDSA implementations. For example, it may be possible to recover a public key in a Rivest-Shamir-Adelman (RSA) PKI system; however, it may involve two digital signatures and the corresponding original messages in order to recover the public key. Other PKI schemes may also be configured such that a public key can be derived from one or more messages and corresponding digital signatures.

In operation 508, the system may query the blockchain network based on the derived public key to verify that a corresponding wallet address exists on the blockchain network and to obtain NFT data associated with that address. The query may be sent to a blockchain node within the blockchain network in some cases. The blockchain node may return one or more messages detailing the NFTs, if any, associated on-chain with that wallet address. In some cases, the response may provide transaction identifiers and/or transaction details that are associated with the wallet address by including the wallet address as an outpoint within the transaction. From the transaction details, the system may determine whether the transactions indicate transfer of an NFT to that wallet address and, if so, the system may send a further query for NFT data regarding that NFT. The request for NFT data may be based on an NFT identifier indicated in the transaction details, or may include other query parameters. In some cases, the request for NFT data may be sent to a blockchain node. In some cases, the system may use an API or other functions defined in a smart contract for obtaining NFT data.

Once the system has obtained NFT data, if any, associated with the wallet address based on the derived public key, it may then assess whether that NFT data meets the access condition associated with a transaction request from the user device, as indicated by operation 510. As noted above, an access rule may impose a condition that the requesting device/user have one or more particular NFTs and/or NFTs with certain attributes. If the NFT data obtained from the blockchain network based on the derived public key meets the condition, then the transaction request is authorized in operation 512. Otherwise it is denied, as indicated by operation 510. Authorizing the request may include notifying a transaction processing system that the transaction is authorized. It may include processing the transaction request to initiate a payment operation. It may include enabling access to a product page and sending the product records/pages to the user device for rendering thereon. Denial of the request may include causing display on the user device of an alternative product page or displaying a transaction refusal message, as examples.

Figure 6:
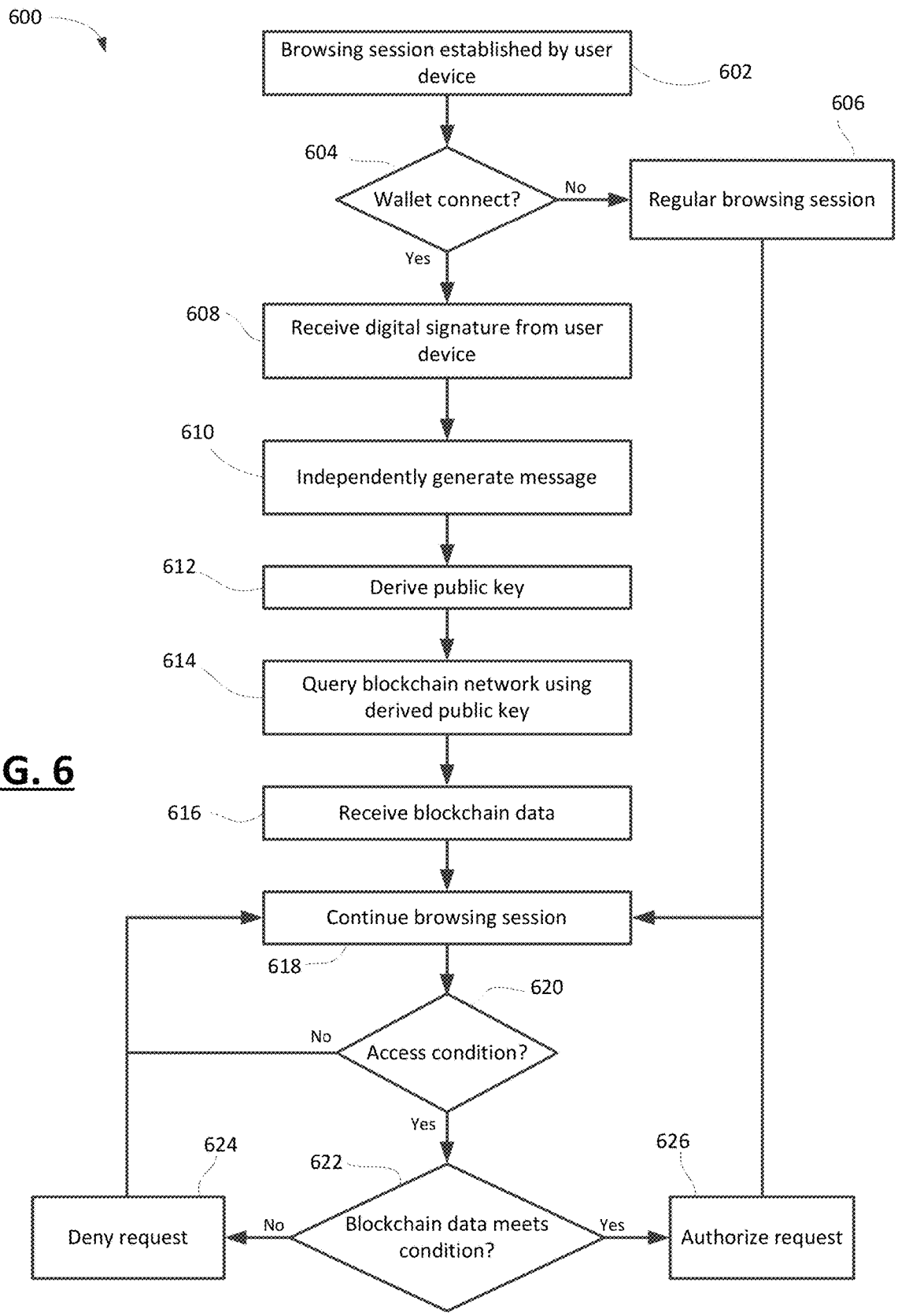
FIG. 6 shows, in flowchart form, another example method of authorizing a transaction request.

Another illustrative example method 600 is shown in flowchart form in FIG. 6. The method 600 may be implemented by way of suitably-programmed software instructions stored in memory on a computing device which, when executed by one or more processors of the computing device, cause the computing device to carry out the described operations. The method 600 may be implemented by a computing system, such as the server 1004 (FIG. 1) in some cases. In some cases, the method 600 may be implemented by one or more servers forming an e-commerce platform or system.

In operation 602, a user device establishes a connection with the system and, in particular, a browsing session. The system may include a web server that receives an HTTP request from a web browser operating on the user device, for example. In another example, the system may operate an app server that receives a connection request, for instance using an API, from a mobile application operating on the user device. The user device and the system may engage in an authentication/login protocol, a handshaking protocol, or the like, as a part of establishing the session and authenticating the user device. In the case of an e-commerce system, the login to an established user account may be an optional step since non-authenticated devices may be permitted to browse merchant stores on the e-commerce system in a 'guest' mode. In many implementations, the user devices are permitted to select and complete purchases of product items while in guest mode without creating a user account with the e-commerce system.

In operation 604, the system may determine whether the user device is configured to provide blockchain wallet data, e.g. NFT data. This may occur through a wallet connect operation in some cases. Many user devices may not hold or may not provide wallet data and, if so, browsing of interface content may be handled as per normally with no access available to gated items, as indicated by operation 606.

If blockchain wallet data is available from the user device, then in operation 608 the system obtains a digital signature from the user device. The digital signature is generated by the user device by first generating a message. The message may include at least one session-specific data item known to both the system and the user device. The session-specific data item may be a session identifier, a cart token, or other such data. The data item may have been exchanged by the system and user device over the communications channel, preferably in encrypted form, or may be independently generated by the system and the user device without exchanging it over the communications channel using an agreed-upon mechanism for generating the shared session-specific data item, such as respective deterministic pseudorandom number generators.

The user device generates the digital signature using the message and a private key securely stored on the user device. The private key is likely stored in a secure area of memory managed by the wallet application. A function available through the wallet application may generate a digital signature corresponding to a specific wallet address (e.g. wallet public key) when the function is called with reference to a message to be signed. The message may be hashed prior to signing in some cases. The signature may be received in reply to a prompt or request from the system in some cases. The signature may be proactively sent by the user device as part of a prescribed handshaking operation during establishment of the browsing session without requiring a request from the system in some implementations.

The digital signature received in operation 608 is not accompanied by the public key associated with the wallet address corresponding to the digital signature. In fact, in this example, the system does not receive the corresponding public key/wallet address from the user device in any communication over the channel.

In operation 610, the system independently generates the same message that was signed by the user device. As noted above, the message may be based on a pre-configured structure and content that includes at least one session-specific data item.

The system then derives the public key corresponding to the private key used to generate the digital signature, based on the digital signature and the message generated by the system. As noted above, public key recovery operations may be used to obtain candidate public keys using only the digital signature and the message. In some cases, the digital signature may include additional data enabling the system to determine which candidate public key is the correct key, like in the case of an extended ECDSA signature. In some implementations using certain PKI schemes, more than one message may be generated and more than one digital signature may be received from the user device, so as to enable public key recovery.

Having derived the public key, the system then queries the blockchain network in operation 614. The query may include providing the public key to a blockchain node in a message to obtain verification that the public key corresponds to a valid blockchain wallet address on the blockchain network. The response from the blockchain node may provide details of the tokens or other digital assets recorded on chain as being owned by the wallet address. In some cases, the query and response may include multiple queries and responses in order to obtain details of the NFTs, if any, associated with the wallet address. In some cases, the system may obtain NFT identifiers associated with the wallet address and may send a further query or other search request regarding the NFT identifiers to obtain specifics of those NFT, such as the collection to which they belong, their metadata, media, attributes, or other data regarding the NFTs. As indicated by operation 616, the system obtains blockchain data associated with the wallet address from the blockchain network.

As shown in operation 618, the system and the user device continue to engage in a browsing session, which may include receiving requests from the user device for certain product pages or searches for products or initiation of checkout or payment operations. The requests may be categorized as "transaction requests". The system responds to those transaction requests by providing the requested product pages or search results or other requested content or initiating payment or checkout operations, etc. However, in responding to each request the system determines whether the transaction request is subject to an access control restriction. In particular, as shown by operation 620. The system identifies whether the requested content or requested operation is subject to an access control rule and retrieves the rule and/or its condition from memory. If not, then the browsing session continues in operation 618.

If there is an access control rule, then the condition in this example relates to ownership of one or more NFTs having certain attributes or being from a particular collection or class of NFTs. In operation 622, the system determines whether the blockchain data obtained in operation 616 from the blockchain network satisfies the condition. The blockchain data obtained details the NFTs associated with the wallet address determined by the system using public key recovery in operation 612. If the wallet address (or addresses if multiple) have NFTs that satisfy the conditions, then authorization is granted in operation 626 and the browsing session continues in operation 618. If the condition is not satisfied, then authorization is denied in operation 624 and the browsing session continues in operation 618. Authorizing the request may include notifying a transaction processing system that the transaction is authorized. It may include processing the transaction request to initiate a payment operation. It may include enabling access to a product page and sending the product records/pages to the user device for rendering thereon. Denial of the request may include causing display on the user device of an alternative product page or displaying a transaction refusal message, as examples.

It will be appreciated that there may be multiple wallet addresses managed by the user device, such that the system may obtain multiple digital signatures and perform multiple public key derivation operations, and multiple queries to the blockchain network for NFT data regarding each derived public key.

The above-described operations of FIG. 6 detail operations in which the system receives a digital signature and derives a public key after initial establishment of a browsing session. In this manner the system already has obtained blockchain data associated with the user device if an access rule is triggered during the browsing session. The system can therefore quickly assess whether the obtained data indicates that the access control rule is satisfied during browsing. In some cases, however, the system may only seek a digital signature if an access control rule relating to blockchain asset ownership is triggered during the browsing session.

In any of the above-described example methods or processes it will be understood that certain operations described as occurring in sequence may be implemented in a different sequence or carried out in parallel without impacting the overall functioning of the method or process.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 7:
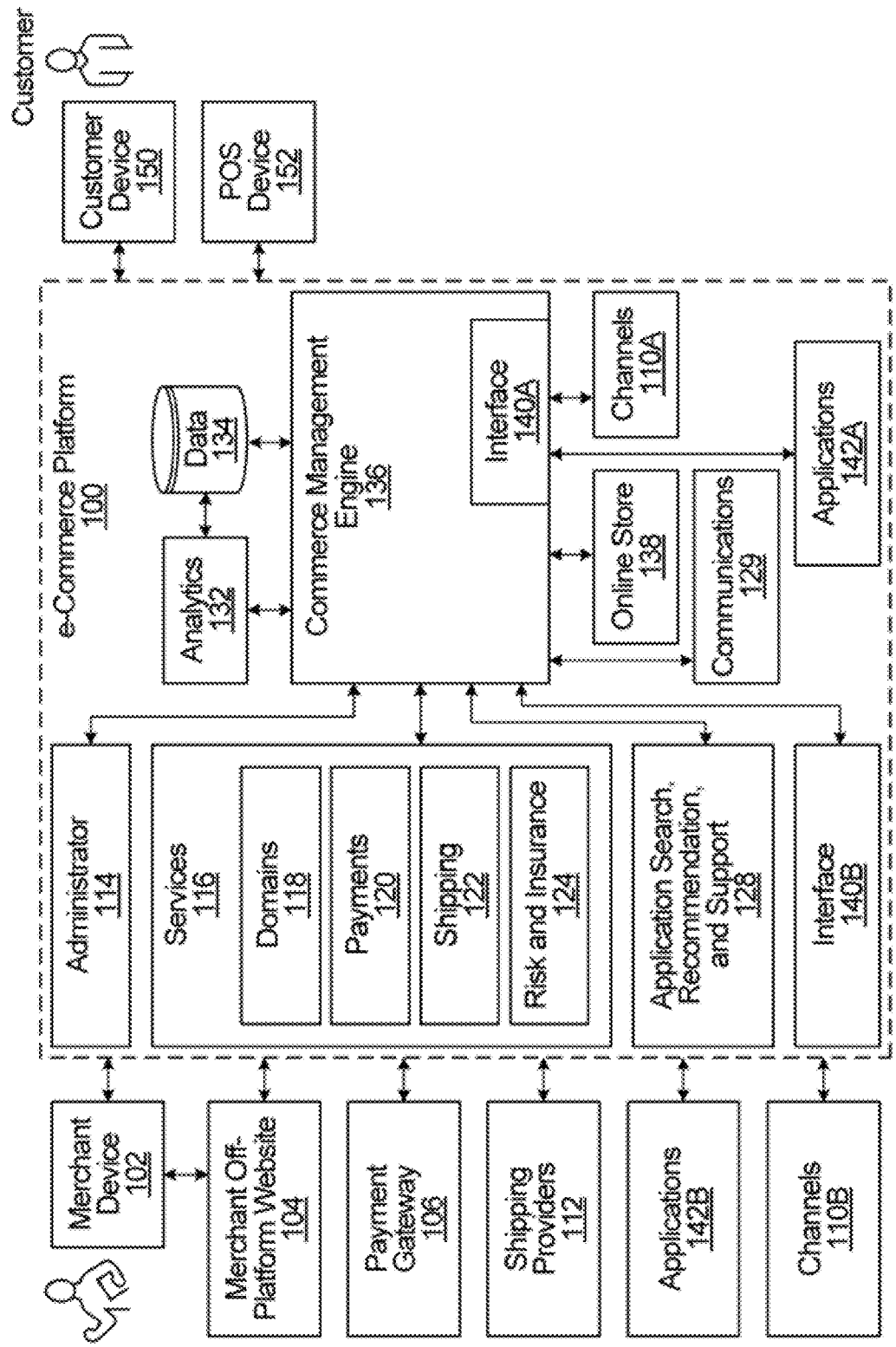
FIG. 7 is a block diagram of an e-commerce platform, in accordance with an example embodiment.

FIG. 7 illustrates an example e-commerce platform 100, according to one embodiment. The e-commerce platform 100 may be exemplary of the server 1004 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 8:
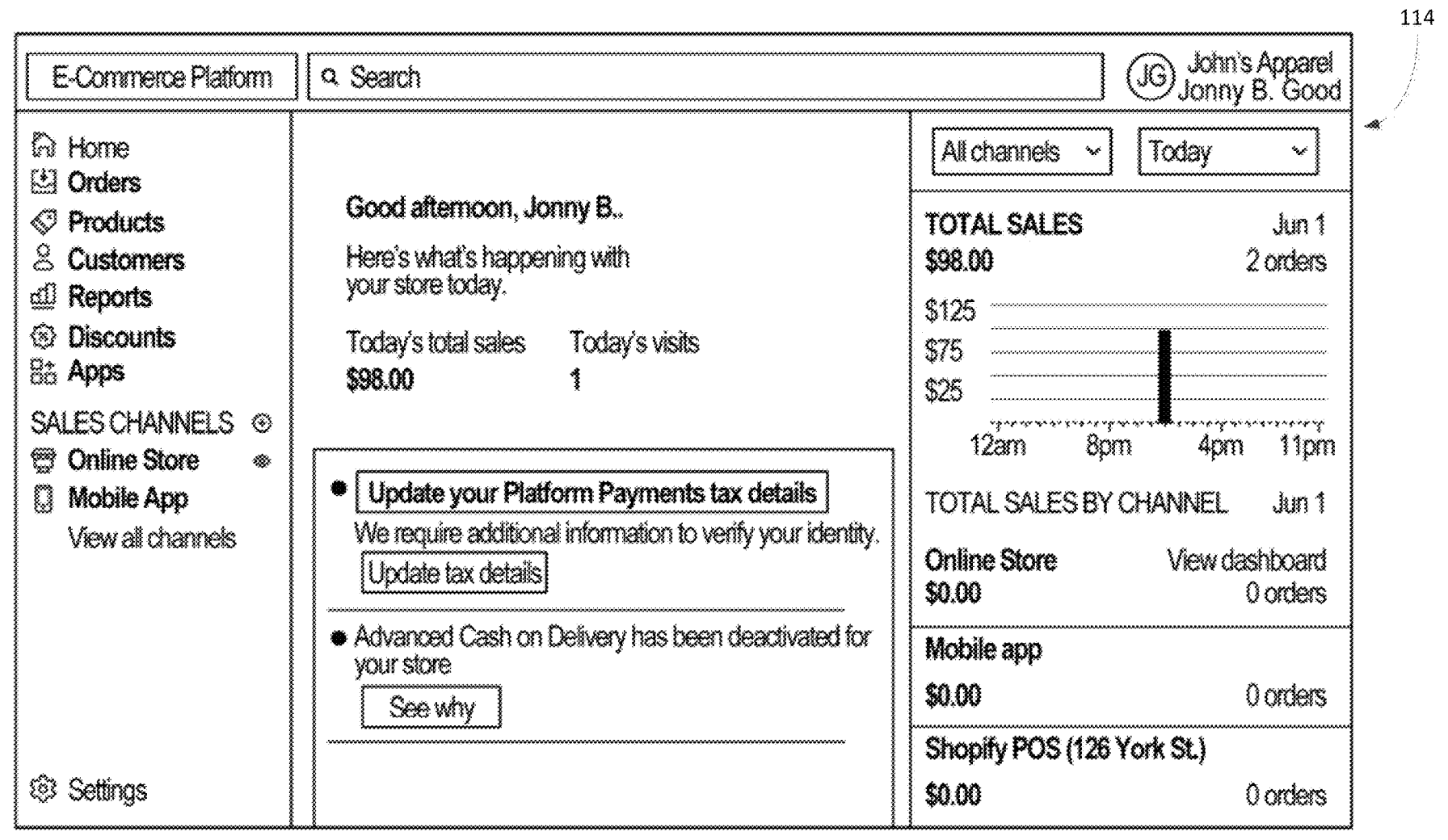

FIG. 8 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 8. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 7, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
receiving, by a server from a user device, a digital signature for a message, the message being based on session-specific data regarding an active session with a transaction processing system and being signed using a private key associated with a blockchain wallet address;
generating, by the server, the message based on the session-specific data;
deriving, based on the message as generated by the server and the digital signature as received, a public key corresponding to the private key used to generate the digital signature;
obtaining blockchain data associated with the public key from a blockchain network; and
authorizing a transaction on the transaction processing system for the user device based on the blockchain data.

2. The computer-implemented method of claim 1, wherein the message is not transmitted between the user device and the server.

3. The computer-implemented method of claim 1, wherein the public key is not transmitted between the user device and the server.

4. The computer-implemented method of claim 1, wherein the session-specific data includes at least one of a session identifier, a cart token, or a checkout token.

5. The computer-implemented method of claim 1, wherein the digital signature is generated using elliptic curve cryptography.

6. The computer-implemented method of claim 1, wherein the blockchain data includes non-fungible token data associated with the blockchain wallet address.

7. The computer-implemented method of claim 6, wherein authorizing the transaction includes permitting the transaction based on ownership of one or more non-fungible tokens by the blockchain wallet address.

8. The computer-implemented method of claim 1, wherein obtaining blockchain data associated with the public key from the blockchain network includes verifying that the public key corresponds to the blockchain wallet address and obtaining non-fungible token ownership data associated with the blockchain wallet address.

9. The computer-implemented method of claim 1, wherein communications between the user device and the server occur over a data connection and wherein the message includes at least one data element determined independently by the user device and the server and not transmitted over the data connection.

10. The computer-implemented method of claim 9, wherein the at least one data element includes a nonce value independently determined by each of the user device and the server using respective deterministic pseudorandom number generators.

11. A computing system, comprising:
one or more processing units;
one or more data storage units;
memory storing processor-executable instructions that, when executed by the one or more processing units, are to cause the processing units to:
receive, from a user device, a digital signature for a message, the message being based on session-specific data regarding an active session with a transaction processing system and being signed using a private key associated with a blockchain wallet address;
generate the message based on the session-specific data;
derive, based on the message as generated and the digital signature as received, a public key corresponding to the private key used to generate the digital signature;
obtain blockchain data associated with the public key from a blockchain network; and
authorize a transaction on the transaction processing system for the user device based on the blockchain data.

12. The computing system claimed in claim 11, wherein the message is not transmitted between the user device and the computing system.

13. The computing system claimed in claim 11, wherein the public key is not transmitted between the user device and the computing system.

14. The computing system claimed in claim 11, wherein the session-specific data includes at least one of a session identifier, a cart token, or a checkout token.

15. The computing system claimed in claim 11, wherein the digital signature is generated using elliptic curve cryptography.

16. The computing system claimed in claim 11, wherein the blockchain data includes non-fungible token data associated with the blockchain wallet address.

17. The computing system claimed in claim 16, wherein the instructions, when executed, are to cause the one or more processing units to authorize the transaction by permitting the transaction based on ownership of one or more non-fungible tokens by the blockchain wallet address.

18. The computing system claimed in claim 11, wherein the instructions, when executed, are to cause the one or more processing units to obtain blockchain data associated with the public key from the blockchain network by verifying that the public key corresponds to the blockchain wallet address and obtaining non-fungible token ownership data associated with the blockchain wallet address.

19. The computing system claimed in claim 11, wherein communications between the user device and the computing system occur over a data connection and wherein the message includes at least one data element determined independently by the user device and the computing system and not transmitted over the data connection.

20. The computing system claimed in claim 19, wherein the at least one data element includes a nonce value independently determined by each of the user device and the computing system using respective deterministic pseudorandom number generators.

21. A non-transitory, computer-readable medium storing computer-executable instructions that, when executed by one or more processors, are to cause the one or more processors to:
receive, from a user device, a digital signature for a message, the message being based on session-specific data regarding an active session with a transaction processing system and being signed using a private key associated with a blockchain wallet address;
generate the message based on the session-specific data;
derive, based on the message as generated and the digital signature as received, a public key corresponding to the private key used to generate the digital signature;
obtain blockchain data associated with the public key from a blockchain network; and
authorize a transaction on the transaction processing system for the user device based on the blockchain data.

* * * * *